Oct. 3, 1933.                P. D. CROUT                1,928,848
                       ELECTRIC ARC WELDING SYSTEM
                       Filed March 10, 1933    3 Sheets-Sheet 1

INVENTOR
PRESCOTT D. CROUT
by Elmer J. Gorn
ATTORNEY.

Oct. 3, 1933.   P. D. CROUT   1,928,848
ELECTRIC ARC WELDING SYSTEM
Filed March 10, 1933   3 Sheets-Sheet 2
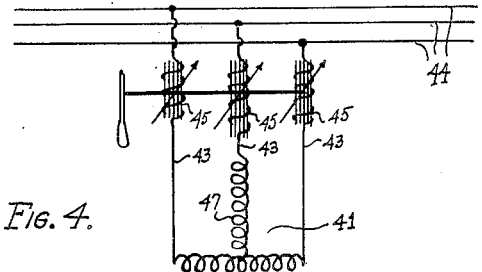
Fig. 4.
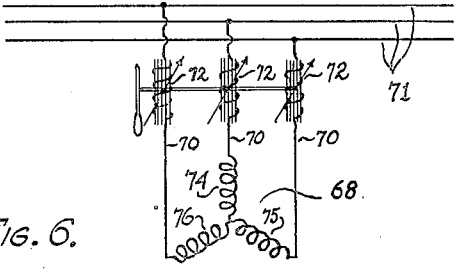
Fig. 6.
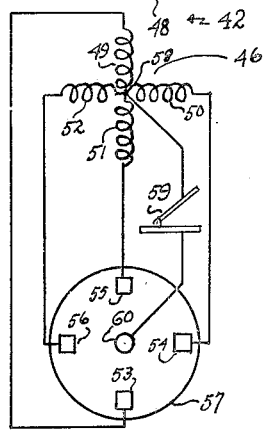
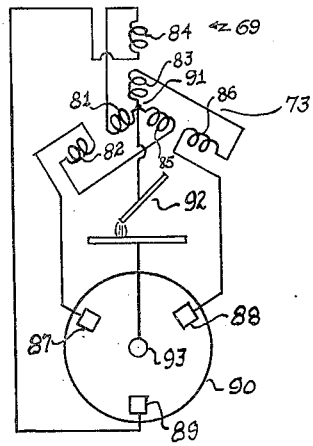
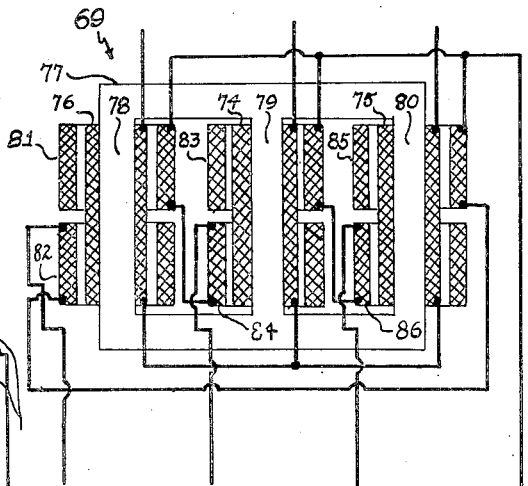
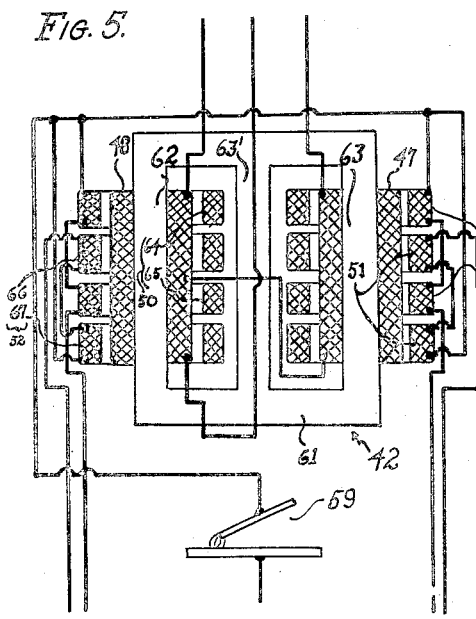
Fig. 5.
Fig. 7.
INVENTOR
PRESCOTT D. CROUT
by Elmer J. Gorn.
ATTORNEY.

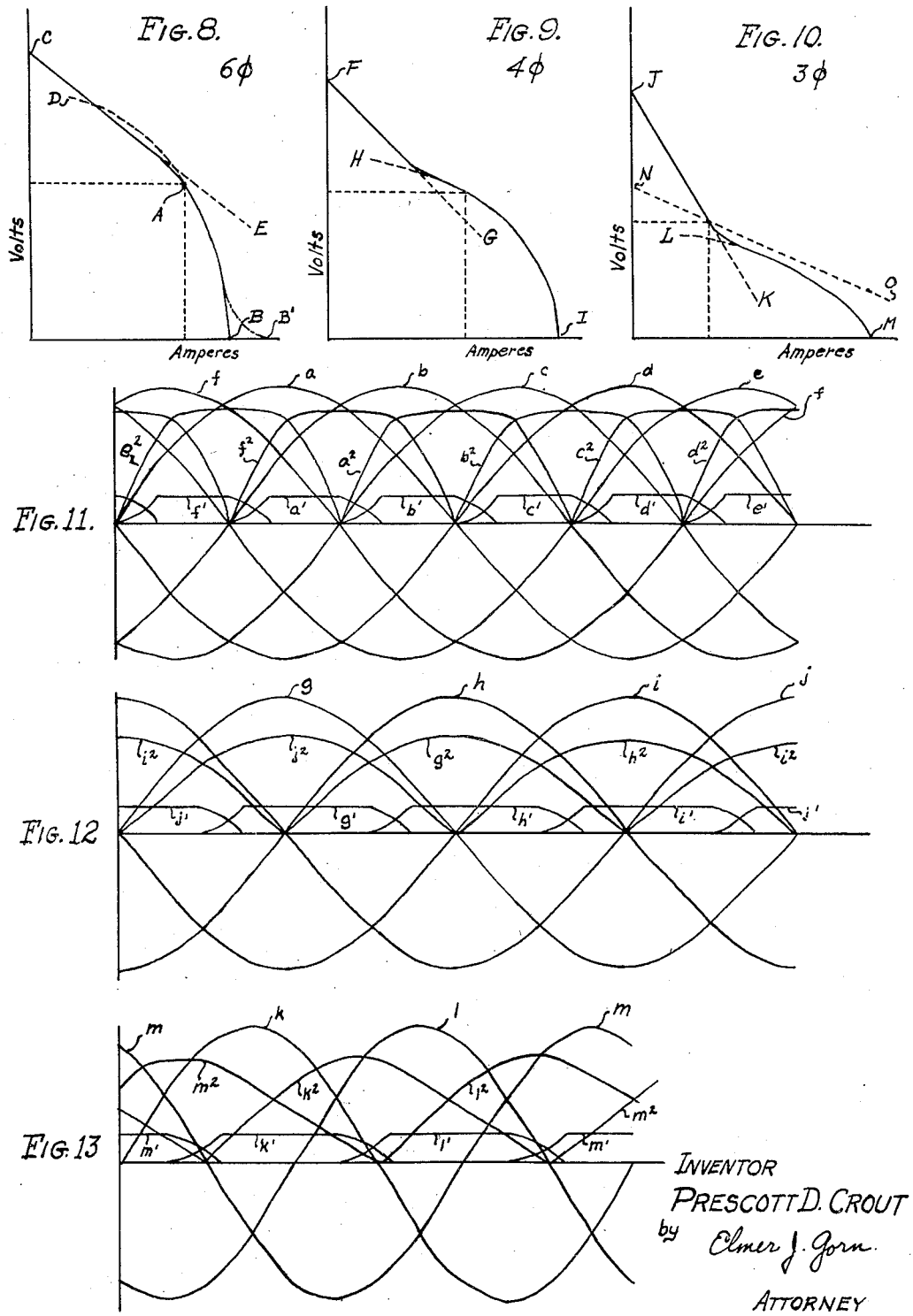

Patented Oct. 3, 1933

1,928,848

UNITED STATES PATENT OFFICE 1,928,848

ELECTRIC ARC WELDING SYSTEM

Prescott D. Crout, Boston, Mass., assignor to Raytheon, Inc., Cambridge, Mass., a corporation of Massachusetts Application March 10, 1933. Serial No. 660,258

15 Claims. (Cl. 219—8)

This invention relates to an electric arc-welding system, and more particularly to such a system which utilizes a rectifier to convert alternating current into direct current.

An object of my invention is to produce such a system having a current-voltage output characteristic curve which shall satisfy certain ideal conditions for arc-welding.

A further object of my invention is to produce such a system in which under rapidly varying or transient load conditions the current-voltage output characteristic curve shall closely coincide with the steady state curve.

A still further object of my invention is to produce a device in which the size of the apparatus is a minimum for its load rating.

The foregoing and other objects of my invention will be best understood from the following description of exemplifications thereof, reference being had to the accompanying diagrammatic drawings, wherein:

Figs. 4 and 6 show forms of my novel system utilizing four and three phases, respectively;

Figure 1:
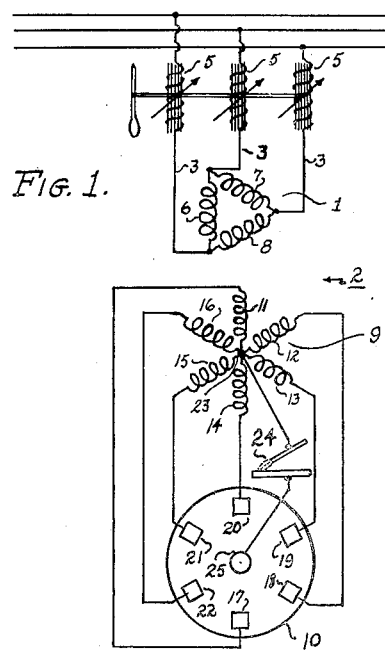
Fig. 1 shows one modification of my novel system utilizing six phases.

Figs. 5 and 7 each shows one form of transformer which may be used respectively in the systems shown in Figs. 4 and 6;

Figs. 8, 9 and 10 show characteristic output curves of the systems shown in Figs. 1, 4 and 6, respectively; and Figs. 11, 12 and 13 contain curves showing the manner in which the anodes of the rectifier, in the system shown in Figs. 1, 4 and 6, respectively, conduct current.

In electrical arc welding it is desirable that the system which is used should have certain characteristics. These characteristics may be better understood by referring to Fig. 8 which shows a curve on which the output current has been plotted against the output voltage of an arc welding system constructed in accordance with my invention. When the arc has been drawn and the actual welding is being done, a certain voltage occurs across the arc and a certain current flows through the arc, as, for example, is illustrated by point A in Fig. 8. The voltage is ordinarily in the neighborhood either of about 40 volts or 20 volts, while the amount of current which it is desired to have the arc draw will depend upon the type of work involved. However, a definite value of current is found to be most effective in each instance. It is likewise desirable that this value of current should not be allowed to vary to any considerable degree with other variations in the system. Such other variations are inevitable in an arc welding system, due to a variety of causes, among which are the variations in the position of the arc electrodes, the movement of molten metal in the arc, and the variations in the work itself. Thus it will be seen that in most instances the desirable current voltage output characteristic of such a system is very steep throughout its working range in order that but a slight variation in current may exist throughout this range. When the welding electrode is in actual contact with the work and short-circuit conditions exist, as shown for example at point B in Fig. 8, it is desirable that the amount of current which flows under these conditions be somewhat higher than for actual welding conditions. This is due to the fact that such higher value of current will enable the arc initially to be more easily drawn, and also will tend to prevent the electrode from sticking to the work if it comes into contact therewith while the welding is being carried on. It will be seen that the value of this short-circuit current determines the maximum current which the system must be designed to handle. One factor which governs the size of the apparatus involved is this maximum current value. It is therefore further desirable that this short-circuit current be kept as small as possible and still satisfy practical working conditions. Long experience has disclosed that the ratio of normal welding current, at the 40 volt standard N. E. M. A. rating, to short-circuit current should be less than about 1.5, and a most satisfactory ratio is 1.3. Another factor which determines the size of the apparatus used is the open circuit voltage which appears across the welding terminals. Since the product of the open circuit voltage and the short-circuit current determines largely the size of the apparatus which must be used, it is desirable to keep the open-circuit voltage as well as the short-circuit current as low as possible, and still satisfy practical working requirements. This condition requires that, as shown in Fig. 8, the current voltage output curve of the device shall bend back sharply just above the working range and the current shall fall rapidly to zero, as illustrated at point C, without any considerable increase in the voltage across the welding load.

The characteristic curve, as shown in Fig. 8, is of course one which is plotted from steady state conditions of a system, that is, conditions in which there are no rapid variations in any of the quantities involved. However, in an arc welding system we encounter many transient conditions which complicate the problem considerably. These transient conditions result from rapid shifting of the position of the welding electrode or from the rapid motion of molten metal through the arc as well as from various other factors. These transient conditions disturb the equilibrium of the system and ordinarily would tend to cause the transient conditions to differ quite widely from the steady state conditions illustrated in Fig. 8. Such variations are particularly undesirable inasmuch as they may tend not only to injure the work by causing excessive currents and voltages to occur thereat, but also to overload the entire system. A particularly desirable feature of an arc welding system, therefore, is to have the transient characteristics coincide closely with the steady state characteristics. None of the systems heretofore devised has been able to accomplish this result. In accordance with my present invention, however, I am enabled to satisfy the above requirements.

I have discovered that all of the above desirable characteristics may be obtained by an arrangement consisting of (1) a plural phase A. C. source with a rectifier for converting the alternating current into direct current for the purposes of arc welding; and (2) a transformer, having multiphase secondary windings, interposed between the alternating current source and the rectifier, which transformer has inductance in series with its primary windings and whose secondary windings together with the circuits connected thereto, including the load circuit, are substantially entirely free of self-inductance. By the term "multiphase" as used in the specification and claims, I mean that the number of phases is three or more. I have discovered moreover that when a system, having a transformer with a six-phase secondary, is used, the resulting characteristics of the system satisfy ideally all of the requirements as set forth above.

Fig. 1 represents a six-phase system. In this figure the primary windings 1 of a transformer 2 are fed through the conductors 3 from a plural phase source of alternating current 4, which is preferably a three-phase line. Interposed in each of the conductors 3 is an adjustable inductance 5. The adjustment of each of the inductances 5 is preferably tied together so that simultaneous adjustment of these inductances takes place. The primary windings 1 of the transformer 2 consist of individual phase windings 6, 7 and 8. The secondary windings 9 of the transformer 2 are arranged to supply six phases to a suitable rectifier 10. Although I have illustrated a delta-star transformer connection, it is to be understood that any equivalent connection, such as for example a star-star connection, may be used. The secondary windings 9 consist of individual phase windings 11 to 16, inclusive, the outer ends of which are connected to anodes 17 to 22, inclusive, of a rectifier 10. The inner ends of the secondary windings 9 are all connected to a common point 23 which is connected through an arc welding load 24 to the cathode 25 of the rectifier 10. Since the rectifier 10 is one which is subjected to the rather severe requirements of an arc welding load, it preferably is a gaseous arc discharge tube constructed with a cathode of the general type, as described in the co-pending application of Laurence K. Marshall, Serial No. 605,249, filed April 14, 1932.

The inductances 5 are adjustable in order that the value of welding current for different types of work may be varied. The operation of such inductances as these are described in the co-pending application of F. S. Dellenbaugh, Jr., Serial No. 632,921, filed September 13, 1932.

In order to produce the desired results in such a system as illustrated in Fig. 1, it is necessary that the transformer 2 be constructed in such a manner that the self-inductance of each of the secondary windings 9 is substantially entirely eliminated or at least is kept below a certain maximum value. Also it is necessary that no inductance be inserted in any of the anode leads and that the value of inductance in the output load circuit of the rectifier be small. Any inductance in the load circuit serves no useful purpose and interferes to some degree with the best operation of the system. Ordinary methods of constructing the secondary windings of a six-phase transformer will not produce the best results in my system.

Figure 2:
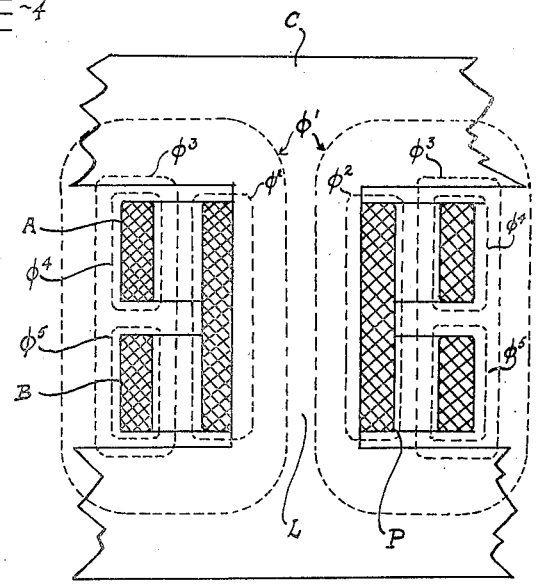
Fig. 2 is a fragmentary view of a transformer showing the various fluxes therein.

In order to understand more clearly what I mean by "self-inductance" of the secondary windings and to explain the manner in which I have substantially entirely eliminated such self-inductance, reference is had to Fig. 2 which shows diagrammatically a fragmentary part of a transformer core C, said fragmentary portion showing one leg L of said core. On the leg L is wound a primary coil P, a secondary coil A of one phase of a multiphase secondary system, and an opposite secondary coil B belonging to another phase of said multiphase secondary system and wound oppositely thereto. Magnetic fluxes which occur during operation of such a transformer can be resolved into various components, as shown in Fig. 2. First of all there is the main flux $\phi^1$ which links the primary winding P and both the secondary windings A and B. Then there is the primary leakage flux $\phi^2$ which only links turns of the primary winding P. Linking both the secondary windings A and B is a third flux $\phi^3$ which may be termed the interphase flux. Finally around the windings A and B, respectively, are to be found fluxes $\phi^4$ and $\phi^5$ which link only turns respectively of the windings A and B. When referring to secondary leakage fluxes in the specification and claims, I mean fluxes of the nature of $\phi^4$ and $\phi^5$ only. The presence of fluxes $\phi^1$, $\phi^2$ and $\phi^3$ have no detrimental effect on the operation of my system, and it is possible to construct a system having a transformer in which the magnitude of each of these fluxes reaches a considerable value and yet whose operating characteristics are ideal for the purposes of arc welding. However, the fluxes $\phi^4$ and $\phi^5$ should be substantially eliminated and preferably are kept below a certain predetermined maximum value in order to produce a system having the desired characteristics. This maximum value will of course be different with different sizes and different designs of the system. In any case the value of the fluxes $\phi^4$ and $\phi^5$ should be of an order of magnitude less than that which, under the most adverse current conditions, introduces an inductive voltage drop in the respective phase winding which is of the same order of magnitude as the total voltage appearing across said phase winding at the same time. The inductive drop through the individual phase winding due to fluxes of the nature of $\phi^4$ and $\phi^5$ should be always small in comparison with the total voltage appearing across said phase winding at the same time. If these fluxes $\phi^4$ and $\phi^5$ are permitted to be greater than said predetermined maximum, the form of the steady state load output current voltage characteristic curve will differ considerably from such an ideal curve as is illustrated in Fig. 8, and also the output current voltage characteristic of this system under transient load conditions may be considerably different from said steady state output curve. The fluxes $\phi^4$ and $\phi^5$ give rise to a self-inductance of each of the secondary windings A and B. This self-inductance tends to oppose any change of current through these windings. Since in the systems as illustrated in Fig. 1, each secondary winding carries a direct current component of current, if the secondary windings had considerable leakage flux, their self-inductance, especially under heavy loads, would tend to cause the direct current flowing through them to remain constant. As will be explained below, this is particularly undesirable in my system. The secondary self-inductance referred to in the present specification and claims is the self-inductance which during normal operation of such a system as shown in Fig. 1 gives rise only to such fluxes as $\phi^4$ and $\phi^5$ which tend to cause the respective phase winding through which the anode current flows to act as a pure choke coil and introduce pure inductive voltage drops in said winding upon passage of said anode current. This secondary self-inductance is the full equivalent of a pure inductance external to and in series with the respective secondary winding.

As previously stated, ordinary methods of constructing a six-phase transformer cause the self-inductance of the secondary windings to be considerably greater than is suitable for the most satisfactory form of my system. In order to avoid such a result, I preferably construct my six-phase transformer in such a manner as shown, for example, in Fig. 3. In this figure the transformer 2 is shown as consisting of the usual core 26 having three legs 27, 28 and 29, upon which are wound the primary windings 6, 7 and 8, respectively. Each individual secondary phase winding is divided into a plurality of sections, and interleaved with the sections of another individual secondary phase winding mounted upon the same leg. Thus, for example, the secondary winding 11 cooperating with the primary winding 6 is divided into sections 30 and 31. The other secondary winding 14 cooperating with the same primary winding 6 is divided into sections 32 and 33. All of these sections are wound around the same portion of the leg 27, as shown. Although a clearance is shown between the various windings in this figure, as well as in other figures, this is adopted merely for the sake of clarity, and in actual practice the windings would be much closer to each other. By interleaving sections of the secondary winding as illustrated, most of the leakage flux which tends to pass around the turns of each individual secondary phase winding will interlink turns of the other individual secondary phase winding mounted upon the same transformer leg. In this manner fluxes which would ordinarily tend to be pure leakage flux become interphase fluxes, thus decreasing the secondary self-inductance. As pointed out with reference to Fig. 2, such interphase flux does not have any detrimental effect upon the operation of my system. As pointed out above, the secondary self-inductance should be of an order of magnitude less than that which, under the most adverse current conditions, will introduce inductive voltage drops in the respective secondary windings which are of the same order of magnitude as the total voltages appearing across the secondary windings. The most adverse condition is usually the condition in which the welding electrode is in actual contact with the work under the highest current setting of the system. This is the general criterion which must be followed in each case to obtain the maximum permissible value of secondary self-inductance for the best operation of my system.

I have found that in typical embodiments of my invention, the order of magnitude of the maximum permissible secondary self-inductance in each secondary phase winding may be obtained from the following equation:

$$L_S = \frac{\alpha}{f} \times \frac{E}{I} \text{ millihenrys} \quad \text{(Equation 1)}$$

where $\alpha$ is a constant depending upon the general design, type, and number of secondary phases of the system, $f$ is the frequency of the supply voltage, E is the number of open circuit volts appearing across the load, and I is the number of amperes through the load with the welding electrode in actual contact with the work. This value of current is ordinarily termed the short-circuit current. In a typical embodiment of the six-phase system which I have described, I have found that the value of $\alpha$ is approximately 15. Thus, for example, in a typical six-phase system rated at 200 amperes short-circuit current and 80 volts open-circuit voltage, I have found that with a self-inductance of .054 millihenrys in each secondary phase, an ideal characteristic is obtained, while with an inductance of .3 millihenrys in each secondary phase, a very undesirable characteristic is obtained. However, since the effect upon the system of the secondary self-inductance depends upon a large number of factors, it may be possible to construct other modifications of my invention other than that which I have described, in which the value of the maximum permissible secondary self-inductance differs somewhat from that obtained by utilizing a value of 15 for $\alpha$ in Equation (1). However, by following the general criterion, as stated in the preceding paragraph, the proper value of the maximum permissible secondary self-inductance may be obtained in each case.

Figure 3:
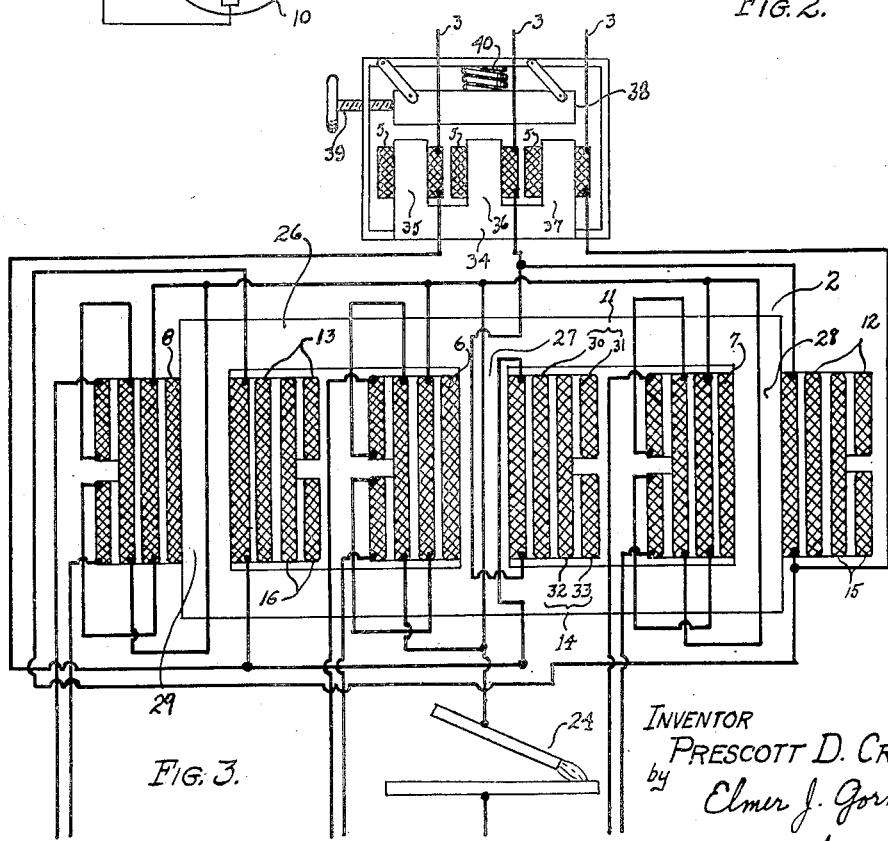
Fig. 3 shows one form of transformer and variable inductance which may be used in the system shown in Fig. 1.

Any inductance in the anode leads themselves acts like an inductance in the respective secondary phase winding in so far as its effect on the characteristic of the system is concerned. Ordinarily the inductance of the usual anode leads is so small as to have a negligible effect on the system. However, in designing such a system it should be borne in mind that the introduction of additional inductive elements into the anode leads is very undesirable. Inductance in the load circuit itself does not exert such a strongly detrimental effect as inductance in the anode leads and the transformer secondary windings. However, as indicated above, such load inductance serves no useful purpose, and does interfere to a considerable degree with the best operation of my system. Therefore, introduction of inductive elements into the load circuit should be avoided. The method of interleaving the secondaries in Fig. 3 is merely one illustration of the manner in which this problem can be solved. Any manner of interleaving the secondaries to accomplish the desired result or any other means which might be adopted to reduce the secondary leakage flux below the allowable maximum is included within the scope of my invention. The transformer as constructed in Fig. 3 eliminates another kind of secondary inductance, which if permitted to exist in any substantial amount would adversely affect the operation of my system to a considerable degree. This second type of inductance will be better understood by again referring to Fig. 2. Let us assume that but one secondary winding A in Fig. 2 is provided on leg L, and said secondary winding feeds an anode of a rectifier. Under these conditions, current could flow through said winding A in but one direction. Therefore the magneto-motive force which said winding produces tends to set up a flux which is unidirectional. Under these conditions the resultant flux in the leg L would have a definite unidirectional component. If a welding system, such as, for example, shown in Fig. 1 were provided with a transformer in which fluxes having unidirectional components were to pass through the secondary windings, said unidirectional components of flux would produce exactly the same effect on the system as would the presence of a pure inductance of considerable value in series with the load 24. Since the existence of a unidirectional flux component through a secondary winding in such a system produces the above effect, I prefer to designate the effect of such a unidirectional flux as an equivalent load inductance in the respective secondary winding. As stated above, any load inductance adversely affects not only the shape of the resultant curve obtained from such a system as I have described, but also tends to make the transient conditions differ considerably from the steady state conditions. It is therefore desirable that such equivalent load inductances in the secondary windings of my system be eliminated. If we provide the transformer leg L in Fig. 2 with two oppositely-wound coils, such as A and B, and a direct current passes successively through these two windings, it will be seen that while one of the windings produces a magneto-motive force tending to set up a flux in one direction in the leg L, the other coil subsequently produces a magneto-motive force which tends to produce a reversal of said flux. When this condition exists, a complete reversal of the flux through the leg L occurs, and there is no resultant unidirectional flux through said leg. Thus by providing two coils on a transformer leg which successively produce magneto-motive forces in opposite directions, a complete elimination of equivalent load inductance through said windings is obtained. By referring to Fig. 3, we find that this condition exists in the transformer as shown therein.

In Fig. 3 is also shown by way of example one form of adjustable inductance which may be used in my system. This adjustable inductance consists of an iron core 34 having three legs 35, 36 and 37. Upon these legs are mounted the windings 5. A movable core member 38 provides a variable air gap for each of the legs 35, 36 and 37. The size of this air gap may be regulated by means of an adjusting screw 39 which raises or lowers the adjustable core member 38. A spring member 40 is also provided to bias the core member 38 towards its lower position.

Such a system as I have illustrated in Figs. 1 and 3 has the characteristic curve as shown in Fig. 8, which as previously described is one which is ideal for the purposes of arc welding. Upon analyzing the curve as shown in Fig. 8, it will be found that it can be resolved into two major portions, an upper portion lying substantially along the straight line CE and a lower portion lying substantially along the ellipse DB. It will be seen that the ellipse produces the desired drooping form of the curve. In order to determine the reason for this particular shape of the characteristic curve and the fundamental features necessary to produce it, reference may be had to Fig. 11 which illustrates the manner in which the respective anodes of the rectifier 10 conduct the current. We can assume that for very small loads near the open circuit condition of the system, constant current conditions exist in that system. By constant current conditions I mean that the instantaneous current through the load is constant. In the curves as shown in Fig. 11, $a$, $b$, $c$, $d$, $e$ and $f$ represent voltages appearing across the individual transformer secondary windings 11 to 16, inclusive. Under constant current conditions as assumed above, curves $a'$, $b'$, $c'$, $d'$, $e'$ and $f'$ represent the current carried by the anodes connected to said respective windings. Upon looking at these curves, we see that under constant current conditions there are always either one or two anodes conducting current at the same time, and that the total output current which is equal to the current in the load is always constant. If we calculate the characteristic of the system as we increase the load current from zero under constant current conditions, we find that the characteristic will lie along the straight line CE. One effect which such an increase in current will have during this portion of the characteristic will be that as the current increases, the period during which two anodes are conducting at the same time will increase.

Under large values of load current near short-circuit conditions, we can assume that constant voltage conditions exist. Under constant voltage conditions I means that the instantaneous voltage across the load is constant. Such a system as I have disclosed will support such an assumption only when the secondary self-inductances are below the predetermined maximum which I have specified, and the equivalent load inductance is eliminated. Under constant voltage conditions the current through the individual anodes is represented by curves $a^2$, $b^2$, $c^2$, $d^2$, $e^2$, $f^2$. Upon investigating this system of curves, we see that two anodes are always conducting at the same time, and that a third anode begins to conduct as soon as one of the other anodes stops conducting. It can be shown that the presence of two conducting anodes is sufficient to prevent a third anode from starting, thus causing a delay in the starting of said third anode. It is for this reason that the beginning of the conducting period for each anode occurs considerably later than under constant current conditions. A decrease in current causes each of the curves $a^2$, $b^2$, $c^2$, $d^2$, $e^2$ and $f^2$ to start earlier with reference to the voltage cycle of the respective secondary phase. If we calculate this constant voltage characteristic as we decrease the current from short-circuit value, we find that this characteristic lies along the ellipse BD. This operation of the system, namely the prevention of the starting of conduction by an anode, due to the conducting condition of two other anodes, gives to the system its desirable elliptical characteristic.

If we plot both the constant current curve CE and the constant voltage curve BD with respect to the same reference axis, we can assume that the actual characteristic of the system will lie with its upper portion along the line CE and its lower portion along the curve DB with a gradual transition as the characteristic leaves one curve and joins the other.

In typical six-phase systems which I have constructed in the manner in which I have disclosed, I have calculated a theoretical constant current and constant voltage characteristic as described above, and have also measured the actual characteristic of the system. I have found that upon comparing the calculated curve and the actual curve obtained from such a system, it has been extremely difficult to detect any difference in these two curves. I have found further that the current ratio between the point A at a voltage of forty volts and the point B at short-circuit has been 1.3. As has been previously pointed out, this value is one which is ideal for arc welding.

As stated above, the best operation of my system requires that the values of secondary self-inductance shall be below the maximum permissible values defined above. Thus in the typical six-phase system using the value of inductance stated above, the ideal characteristic CAB as shown in Fig. 8 was produced. As the value of secondary self-inductance is allowed to exceed the value resulting in the ideal curve by a small amount, the lower portion of the characteristic curve will be drawn out as indicated by the dot-dash line in the lower portion of Fig. 8. This will produce a slightly higher value of short-circuit current, as indicated by the point B'. If the excess of secondary self-inductance over the defined maximum is kept sufficiently small, the characteristic curve will not be changed substantially at the portion along which the welding usually takes place. It may be that in certain applications the increased value in short-circuit current resulting from a slight excess in secondary self-inductance over the maximum value defined will be desirable. However, I believe that it will be necessary to have the secondary self-inductance sufficiently low so that at the normal voltage which is usually 20 volts, the characteristic curve will not vary appreciably from the ideal curve as shown in Fig. 8. If the value of secondary self-inductance is allowed to increase beyond the point which I have indicated above, it may still be possible to obtain a system in which welding may be satisfactorily carried on in a limited number of cases. However, such additional self-inductance performs no useful function, and does affect the operation of the system adversely to some degree. From the above it will be seen that in its broadest aspect my invention includes a six-phase system of the general type described, even with appreciable self-inductances in the secondary and load circuits.

The general operating characteristics which exist in my novel six-phase welding system exist to some degree in all multiphase systems which incorporate the principles as set forth with reference to the system described above. However, in no system having fewer numbers of phases than six in the secondary of my transformer have I been able to secure the ideal current ratio for arc welding which exists in my six-phase system. However, since my invention is broad enough to include all arc welding devices of the type shown herein utilizing multiphase secondary systems, I have found that in any multiphase system, by utilizing the principles of my invention, arc welding devices can be constructed using transformers having secondary systems of fewer phases than six, whose operating characteristics are satisfactory for certain types of work.

In Fig. 4 I have shown an embodiment of my invention utilizing a transformer having a four-phase secondary. In this figure the primary windings 41 of a transformer 42 are fed through conductors 43 from a plural-phase source of alternating current 44. Inasmuch as the power lines which are ordinarily available are three-phase power lines, the source of alternating current 44 is preferably a three-phase line. Interposed in each of the conductors 43 is an adjustable inductance 45. In a manner similar to that discussed in Fig. 1, adjustable inductances 45 are preferably tied together so that simultaneous adjustment thereof may take place. The transformer 42 also has a set of secondary windings 46. The primary and secondary windings 41 and 46 are connected in a T-connection so as to produce four phases in said secondary winding. The primary windings 41 consist of the windings 47 and 48, one end of the winding 47 being connected to the central point of the winding 48. The secondary windings 46 consist of individual phase windings 49, 50, 51 and 52. Of course any other equivalent transformer connection can be used. The outer ends of the individual secondary windings 49 to 52, inclusive, are connected to anodes 53, 54, 55 and 56, respectively, of a rectifier 57. The inner ends of the secondary windings 46 are all joined to a common point 58 which is connected through an arc welding load 59 to the cathode 60 of the rectifier 57. The rectifier 57 is preferably of the type as indicated for Fig. 1.

In order to produce the desired results in the embodiment of my invention, as shown in Fig. 4, the transformer 42 is preferably constructed in some suitable manner to substantially eliminate the self-inductance of the secondary windings, or at least keep said self-inductance below the maximum value as explained above. For example, this transformer may be constructed as shown diagrammatically in Fig. 5. In this figure the transformer 42 consists of a core 61 having three legs 62, 63 and 63'. The primary windings 48 and 47 are wound upon the legs 62 and 63, respectively. The secondary winding 50 is divided into two sections 64 and 65, which sections are interleaved with the two sections 66 and 67 into which the secondary winding 52 is divided. Both of these secondary windings are wound around the leg 62. The secondary windings 49 and 51 are likewise separated into a plurality of interleaved sections, and are wound around the leg 63. In this manner substantially all of the flux which links turns of one phase winding will interlink turns of another phase winding, thus substantially eliminating all self-inductance in the secondary windings of the transformer 42. Of course the manner of interleaving the secondaries as shown in Fig. 3 could be substituted for the manner of interleaving the secondaries as shown in Fig. 5, and vice versa. Likewise other methods of substantially eliminating the self-inductance of the secondary windings in the system as shown in Fig. 4 could likewise be utilized.

The transformer as constructed in Fig. 5 also eliminates equivalent load inductances in its secondary windings, due to the fact that each leg which carries said secondary windings has at least two secondary windings which successively produce magneto-motive forces in opposite directions.

In typical four-phase systems in accordance with the description given above, the output voltage current curve may be that as shown in Fig. 9. Upon analyzing the curve as shown in Fig. 9, it will likewise be found that it can be resolved into two major portions, an upper portion lying substantially along the straight line FG and a lower portion lying substantially along the ellipse HI. An analysis of the manner in which the anodes in the rectifier 57 conduct current can be made along the same lines as the analysis applied to the operation of the anodes in Fig. 1. For the purposes of this analysis, reference may be had to Fig. 12, in which curves $g$, $h$, $i$ and $j$ represent voltages appearing across the individual phase windings 42 to 52, inclusive. Assuming constant current conditions at light loads, curves $g'$, $h'$, $i'$ and $j'$ represent the currents carried by the corresponding anodes. Upon calculating the characteristic of the system as we increase the load from zero under constant current conditions, we find that it will lie along the straight line FG.

Under large values of load current, we can assume that constant voltage conditions exist. Under constant voltage conditions, the current carried by the individual anodes is represented in Fig. 12 by curves $g^2$, $h^2$, $i^2$ and $j^2$. Upon investigating this system of curves, we see that each anode starts as soon as the prior anode stops. Constant voltage conditions in such a four-phase system require that but two anodes can be conducting at any one time. Therefore, the starting of each anode is considerably delayed in the voltage cycle of the corresponding phase winding connected to said anode, due to the fact that two other anodes are conducting. As soon as one of said other anodes stops conducting, the next anode will start. As we decrease the current from short-circuit value, it will be found that each anode starts to conduct current at an earlier point in the voltage cycle applied thereto. If we calculate this portion of the characteristic as we decrease the current from short-circuit value, we find that this characteristic will lie along the ellipse IH. The peculiar property of the system of preventing the starting of conduction by an anode due to conducting condition of two other anodes gives to the system this elliptical characteristic curve. It will be noted that this function is very similar to that described with reference to the six-phase system of Figs. 1 and 3, in which a similar operation of the conduction of current by the successive anodes of the rectifier exists. In typical four-phase systems as I have disclosed above, the theoretical curves, consisting of the straight line FG and the elliptical curve HI, coincide very closely with the actual measured characteristic of such a system. The characteristic of a four-phase system differs somewhat from the ideal curve obtained in a six-phase system. The ratio between the operating current at a voltage of 40 volts to the short-circuit current has been in a particular instance 1.65, which in certain cases is perfectly satisfactory. In each four-phase system, the order of magnitude of the maximum permissible value of secondary self-inductance may be obtained from the general criterion as defined above, or in a typical embodiment of the system as I have described from Equation (1). I believe that the value of $\alpha$ in Equation (1) as applied to a four-phase system will probably be of the same order of magnitude as that given for my six-phase system. Some deviation from this value within the limits and along the lines as discussed with reference to the system as shown in Fig. 1 may exist.

It will be noted that each of the two systems described above has an even number of secondary phases. I have found that the characteristic of a system utilizing an even number of secondary phases as a general rule appears to be superior for welding purposes to those of systems which have an odd number of secondary phases. This is probably due to the fact that with the even number of secondary phases, the system possesses a natural symmetry, in which we find that each secondary phase has a corresponding secondary phase and the voltages of these phases are 180 degrees apart. Therefore it is a comparatively simple matter to place these two secondary phases upon the same transformer leg, and wind them in opposite directions. In such a situation the alternating flux in said leg set up by the primary winding will induce secondary voltages in the two secondary windings displaced 180 degrees apart, which is the result desired. At the same time there is secured a complete elimination of equivalent load inductance. With systems, however, which utilize an odd number of secondary phases, there is no such natural symmetry, and therefore in the usual transformer having an odd number of secondary phases a considerable unidirectional component of flux exists in each secondary winding. Therefore, in order to construct such systems in accordance with my invention, it is necessary to resort to special means for eliminating the equivalent load inductance. I have discovered means whereby such an elimination of equivalent load inductance can be secured in such systems.

In Figs. 6 and 7 I have illustrated an example of a system having an odd number of secondary phases, namely a three-phase system. The operating characteristics of such a system, although not approaching the ideal as closely as do those of systems described in Figs. 1 and 4, may be satisfactory for certain types of work. In Fig. 6 the primary windings 68 of a transformer 69 are fed through conductors 70 from a plural phase source of alternating current 71, preferably a three-phase power line. Interposed in the conductors 70 are simultaneously adjustable inductances 72 which, for example, may be constructed as are the adjustable inductances 5 in Figs. 1 and 3. The transformer 69 has also a set of three-phase secondary windings 73. The primary windings 68 consisting of the individual phase windings 74, 75 and 76 may be connected in some suitable manner, such as, for example, the Y-connection as shown in Fig. 6, although any equivalent connection may be used.

In order to eliminate equivalent load inductance in the secondary windings of the transformer 69, it is necessary to resort to some such arrangement as shown in Fig. 7, for example. Referring to Fig. 7, the transformer 69 consists of a core 77 having three legs 78, 79 and 80. The primary windings 76, 74 and 75 are mounted upon the legs 78, 79 and 80, respectively. The secondary windings 73 are divided up into six sections 81 to 86, inclusive, two of said sections being mounted upon each of the legs 78, 79 and 80, and being opposed. One of the secondary phase windings consists of the coils 81 and 84 mounted upon the legs 78 and 79 and connected in series. Another of the secondary phase windings consists of the coils 83 and 86 mounted on the legs 79 and 80, and connected in series, while the third secondary phase winding consists of the two coils 82 and 85 mounted upon the legs 78 and 80 and connected in series. In order to make the vectorial result of the two voltages induced in each pair of series-connected secondary sections the vector sum of these two voltages, it is desirable to connect these secondary sections in opposition to each other as shown. It will be seen that each leg of the transformer core 77 carries upon it a winding of at least two secondary phases, which successively produce magneto-motive forces in opposite directions. In this manner an elimination of the equivalent load inductance through each secondary winding is obtained. Although I have shown the secondary sections spaced apart from each other, in practice they are closely coupled, and in this manner the secondary self-inductance may in most cases be decreased to a permissible value without resorting to the special means as shown in the previously described systems. However, in some cases it may be desirable to interleave the two secondary sections on each of the transformer legs in order to reduce the secondary self-inductance below the permissible maximum. The free ends of the secondary coils 82, 84 and 86 are connected to the anodes 87, 88 and 89, respectively, of a rectifier 90, as shown. This rectifier is preferably of the same type as indicated for Fig. 1. The inner ends of the coils 81, 83 and 85 are connected to a common point 91 which in turn is connected through an arc welding load 92 to the cathode 93 of the rectifier 90. The characteristic output curve of such a system as I have illustrated in Figs. 6 and 7 is represented in Fig. 10. This characteristic curve, as in the case of Figs. 8 and 9, can likewise be resolved into two major portions, namely, an upper portion lying substantially along the straight line JK, and a lower portion lying substantially along the ellipse LM. Fig. 13 represents an analysis of the manner in which the anodes of the rectifier 90 conduct current under the limiting conditions of constant current and constant voltage which exist in such a system as I have described. In Fig. 13 the curves $k$, $l$ and $m$ represent the voltages of the individual secondary phase winding connected to the respective anodes 87, 88 and 89 of the rectifier 90. Under constant current conditions at light loads, conduction of the respective anodes is represented by curves $k'$, $l'$ and $m'$, while under constant voltage conditions at heavier loads near short-circuit conditions, the curves $k^2$, $l^2$ and $m^2$ represent the conducting conditions of the anodes to which the voltages $k$, $l$ and $m$ are respectively applied. Under constant current conditions it will be seen that either one or two anodes are conducting at the same time. Under constant voltage conditions, however, it will be seen that two anodes are always conducting and the third anode starts conducting as soon as one of the previous anodes stops conducting. However, it will be seen that since the third anode has to wait until one of the other anodes stops conducting, its conduction is considerably delayed in the voltage cycle of its corresponding phase windings. Any decrease in the current through the load will permit the anodes under constant voltage conditions to start at an earlier point in said secondary phase voltage cycle. As we calculate this portion of the characteristic for various values of current, we find that it will lie along the ellipse LM. As is the case with the systems as shown in Figs. 1 and 4, respectively, the prevention of the starting of conduction by an anode due to the conducting condition of two other anodes gives to the system, as shown in Fig. 6, its elliptical characteristic curve under heavy welding loads.

In the system as shown in Fig. 6, the coupling together of the sections of the individual secondary windings causes the output characteristic curve of the system to drop along its lower portion, thereby rendering it suitable for arc welding. If, for example, we did not so couple together the individual secondary phase windings, a considerable amount of equivalent load inductance and self-inductance would exist in the secondary, and the lower portion of the characteristic curve, as shown in Fig. 10, would lie along the dotted line NO. Under these conditions not only would the characteristic curve have the particularly unsuitable form, as shown in Fig. 10, but also the transient characteristic of the system would be considerably different and worse for the purposes of arc welding than the characteristic lying along the dotted line NO.

The general criterion and Equation (1) may be applied to the three-phase system described above in a manner similar to that indicated for the six and four-phase systems, in order to obtain the maximum permissible value of the secondary self-inductance in each of the three secondary phases. Likewise, deviations from the value so obtained may exist as indicated above. Since the best curve which can be obtained in such a three-phase system differs considerably from such an ideal curve, as indicated in Fig. 8, these deviations from the value of secondary self-inductance obtained from the application of said criterion and equation may be considerably greater than in the four and six-phase systems without noticeably distorting the characteristic curve.

It will be noted that by utilizing such plural-phase systems for the purposes of arc welding as I have described above, I have been enabled to eliminate from the load circuit all such regulating resistances and inductances which heretofore have been considered necessary for the satisfactory operation of an electrical arc welding system. Power companies at the present time require that devices which draw loads of the magnitude which I contemplate drawing with such devices as I have illustrated, shall draw that current from all of the phases of the usual plural-phase power lines rather than from any one phase thereof. My systems enable this to be done. Moreover the systems as described in Figs. 1 and 6 draw balanced loads from the three-phase lines from which they are fed. The system as illustrated in Fig. 4, produces a very slight unbalance of the current in the three-phase lines 44 from which it is energized. However, the unbalance is sufficiently small so that it may be disregarded for all practical purposes.

Although I have described my invention with particular reference to an arc welding system, such a system could be applied to other types of load where characteristics of the type which I obtain by my novel system are desirable. Of course it is to be understood that this invention is not limited to the particular details of the arrangement as described above, as many equivalents will suggest themselves to those skilled in the art. For example, the power lines from which the systems are fed may consist of any plural phase source from which the requisite number of secondary phases may be derived. By plural phase source I mean an alternating current power source consisting of two or more phases. Also the adjustment of the series primary inductances may be had by means other than an adjustable core, such as, for example, taps on the inductive windings themselves. Various other changes in my system will readily suggest themselves.

It is accordingly desired that the appended claims be given a broad interpretation commensurate with the scope of the invention within the art.

What is claimed is:

1. An electrical arc welding system comprising a source of alternating current, an arc welding load, a multiphase rectifier interposed between said source and said load for converting the alternating current into direct current, a transformer interposed between said source and said rectifier, said transformer having primary windings connected to said source and multiphase secondary windings connected to said rectifier, inductance in series with said primary windings, and means for substantially entirely eliminating self-inductance in said secondary windings, whereby the transient current and voltage characteristics of said system coincide with the steady state characteristics.

2. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, inductance in series with said primary windings, and means for substantially entirely eliminating self-inductance in said secondary windings, the circuits connected directly to said secondary windings being substantially free of self-inductance, whereby the transient current and voltage characteristics of said system coincide with the steady state characteristics.

3. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, adjustable inductance in series with said primary windings, and means for substantially entirely eliminating self-inductance in said secondary windings, the circuits connected directly to said secondary windings being substantially free of self-inductance.

4. An electrical arc welding system comprising a plural phase source of alternating current, an arc welding load, a six phase rectifier interposed between said source and said load for converting the alternating current into direct current, a transformer interposed between said source and said rectifier, said transformer having plural phase primary windings connected to said source and six phase secondary windings connected to said rectifier, inductance in series with said windings, and means for substantially entirely eliminating self-inductance in said secondary windings.

5. An electrical arc welding system comprising a plural phase source of alternating current, an arc welding load, a six phase rectifier interposed between said source and said load for converting the alternating current into direct current, a transformer interposed between said source and said rectifier, said transformer having plural phase primary winding connected to said source and six phase secondary windings connected to said rectifier, inductance in series with said primary windings, and means for substantially entirely eliminating self-inductance in said secondary windings, the circuits connected directly to said secondary windings being substantially free of self-inductance.

6. An electrical arc welding system comprising a plural phase source of alternating current, an arc welding load, a six phase rectifier interposed between said source and said load for converting the alternating current into direct current, a transformer interposed between said source and said rectifier, said transformer having plural phase primary windings connected to said source and six phase secondary windings connected to said rectifier, inductance in series with said primary windings, and means for substantially entirely eliminating self-inductance in said secondary windings, the circuits connected directly to said secondary windings and the load circuit being substantially free of self-inductance.

7. An electrical arc welding system comprising a plural phase source of alternating current, an arc welding load, a four phase rectifier interposed between said source and said load for converting the alternating current into direct current, a transformer having plural phase primary windings connected to said source and four phase secondary windings connected to said rectifier, inductance in series with said primary windings, and means for substantially entirely eliminating self-inductance in said secondary windings.

8. An electrical arc welding system comprising a plural phase source of alternating current, an arc welding load, a three phase rectifier interposed between said source and said load for converting the alternating current into direct current, a transformer interposed between said source and said rectifier, said transformer having plural phase primary windings connected to said source and three phase secondary windings connected to said rectifier, inductance in series with said primary windings, and means for substantially entirely eliminating self-inductance in said secondary windings.

9. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, said secondary windings comprising individual phase windings, and inductance in series with said primary windings, the order of magnitude of self-inductance of each individual secondary phase winding being less than the order of magnitude of self-inductance which will produce an inductive voltage drop, under the most adverse current conditions, which is of the order of magnitude of the total voltage appearing across said secondary winding at the same time.

10. An electrical arc welding system comprising a plural phase source of alternating current, an arc welding load, a multi-phase rectifier interposed between said source and said load for converting the alternating current into direct current, a transformer interposed between said source and said rectifier, said transformer having plural phase primary windings connected to said source and multi-phase secondary windings connected to said rectifier, said secondary windings comprising individual phase windings and inductance in series with said primary windings, each of said secondary windings having a self-inductance of the order of magnitude of about $\frac{15}{f} \times \frac{E}{I}$ millihenrys or less, where $f$ is the frequency of the source, E is the open-circuit voltage rating of said system, and I is the short-circuit current rating of said system.

11. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, said secondary windings comprising individual phase windings, and inductance in series with said primary windings, each of said individual secondary phase windings being closely coupled to an opposite secondary phase winding to substantially entirely eliminate secondary self-inductance.

12. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, said secondary windings comprising individual phase windings, and inductance in series with said primary windings, each of said individual secondary phase windings consisting of a plurality of sections in series with each other, the sections of each of said individual secondary phase windings being interleaved with the sections of an opposite secondary phase winding to substantially eliminate individual secondary self-inductance.

13. An electrical arc welding system comprising a plural phase source of alternating current, an arc welding load, a six phase rectifier interposed between said source and said load for converting the alternating current into direct current, a transformer interposed between said source and said rectifier, said transformer having plural phase primary windings connected to said source and six phase secondary windings connected to said rectifier, and inductance in series with said primary windings, the value of self-inductance of the secondary windings and the circuits connected thereto, including the load circuit, being of a value at which the ratio of the normal welding current, at forty volts across the load, to the short circuit current through the arc welding load is of the order of 1.5 or less.

14. An electrical arc welding system comprising a plural phase source of alternating current, an arc welding load, a multiphase rectifier interposed between said source and said load for converting the alternating current into direct current, a transformer interposed between said source and said rectifier, said transformer having plural phase primary windings connected to said source and multiphase secondary windings connected to said rectifier, inductance in series with said primary windings, and means for substantially entirely eliminating self-inductance in said secondary windings and for substantially entirely eliminating equivalent load inductance in said secondary windings, whereby the transient current and voltage characteristics of said system coincide with the steady state characteristics.

15. An electrical arc welding system comprising a plural phase source of alternating current, an arc welding load, a multiphase rectifier interposed between said source and said load for converting the alternating current into direct current, having an even number of phases, a transformer having plural phase primary windings connected to said source and multiphase secondary windings connected to said rectifier, and also having an even number of phases, inductance in series with said primary windings, and means for substantially entirely eliminating self-inductance in said secondary windings.

PRESCOTT D. CROUT.

CERTIFICATE OF CORRECTION.

Patent No. 1,928,848.  October 3, 1933.

PRESCOTT D. CROUT.

It is hereby certified that error appears in the printed specification of the above numbered patent requiring correction as follows: Page 8, line 66, claim 4, before "windings" insert the word primary; and line 76, claim 5, for "winding" read windings; and that the said Letters Patent should be read with these corrections therein that the same may conform to the record of the case in the Patent Office.

Signed and sealed this 14th day of November, A. D. 1933.

F. M. Hopkins (Seal)  Acting Commissioner of Patents.